US011261982B2

(12) United States Patent
Patterson et al.

(10) Patent No.: US 11,261,982 B2
(45) Date of Patent: Mar. 1, 2022

(54) PRESSURE RELIEF VALVE WITH BI-DIRECTIONAL SEAT (71) Applicant: Proserv Gilmore Valve LLC, Houston, TX (US)

(72) Inventors: Andy Patterson, Katy, TX (US); Gerardo Martinez, Houston, TX (US); Preston Weintraub, Spring, TX (US)

(73) Assignee: Proserv Gilmore Valve LLC, Houston, TX (US)

(*) Notice: Subject to any disclaimer, the term of this patent is extended or adjusted under 35 U.S.C. 154(b) by 59 days.

(21) Appl. No.: 16/908,317

(22) Filed: Jun. 22, 2020

(65) Prior Publication Data
US 2020/0408316 A1 Dec. 31, 2020

Related U.S. Application Data (60) Provisional application No. 62/867,691, filed on Jun. 27, 2019.

(51) Int. Cl.
*F16K 17/04* (2006.01)
*F16K 15/06* (2006.01)

(52) U.S. Cl.
CPC ........ *F16K 17/0466* (2013.01); *F16K 17/048* (2013.01); *F16K 15/066* (2013.01); *Y10T 137/7925* (2015.04)

(58) Field of Classification Search
CPC .. F16K 17/0466; F16K 17/048; F16K 15/066; F16K 39/04; F16K 17/046; Y10T 137/7925
See application file for complete search history.

(56) References Cited

U.S. PATENT DOCUMENTS

| | | | |
|---|---|---|---|
| 402,600 | A | 5/1889 | Kemp |
| 1,654,642 | A | 1/1928 | Geissinger |
| 2,140,735 | A | 12/1938 | Gross |
| 2,311,851 | A | 2/1943 | McClure |
| 2,560,841 | A | 7/1951 | Bishop |
| 2,605,108 | A | 7/1952 | Stephens |

(Continued)

FOREIGN PATENT DOCUMENTS

| | | |
|---|---|---|
| CH | 469928 A | 3/1969 |
| DE | 102014224979 A1 | 6/2016 |

OTHER PUBLICATIONS

PCT International Search Report and Written Opinion dated Dec. 1, 2017, for International Application No. PCT/US2017/061567.

(Continued)

*Primary Examiner* — Daphne M Barry
*Assistant Examiner* — Frederick D Soski
(74) *Attorney, Agent, or Firm* — Patterson + Sheridan, LLP (57) ABSTRACT

A pressure relief valve includes a valve body including a monitored pressure inlet leading to a monitored pressure region, a piston having a shear seal bore and a surface facing the monitored pressure region, a vent passage and a the shear seal assembly comprising a seal plate having a sealing surface thereon, and the shear seal assembly includes a sealing surface facing the seal plate and having a first annular area, and a first surface having an annular surface area at least twice as large as the first area of the sealing surface, the first surface facing away from the first area, and a biasing seal in contact with the first surface.

8 Claims, 10 Drawing Sheets

(56) References Cited

U.S. PATENT DOCUMENTS

| | | |
|---|---|---|
| 2,685,296 A | 8/1954 | Boosman |
| 2,729,226 A | 1/1956 | Jones |
| 2,799,523 A | 7/1957 | Parker |
| 2,811,979 A | 11/1957 | Presnell |
| 2,821,972 A | 2/1958 | Banker |
| 2,847,027 A | 8/1958 | Kumpman |
| 2,862,520 A | 12/1958 | Cordova |
| 2,867,463 A | 1/1959 | Snider |
| 2,892,644 A | 6/1959 | Collins |
| 2,906,290 A | 9/1959 | Harding et al. |
| 2,973,746 A | 3/1961 | Jupa |
| 3,022,794 A | 2/1962 | Pippenger |
| 3,114,391 A | 12/1963 | Kurtz |
| 3,145,723 A | 8/1964 | Chorkey |
| 3,189,049 A | 6/1965 | Carlson |
| 3,219,060 A | 11/1965 | Pearl et al. |
| 3,225,786 A | 12/1965 | Elliott |
| 3,279,805 A | 10/1966 | Quinson |
| 3,305,208 A * | 2/1967 | Bredtschneider ....... F16K 3/314 251/88 |
| 3,316,930 A | 5/1967 | Garduer |
| 3,329,168 A * | 7/1967 | Vollmer .............. F15B 13/0402 137/625.65 |
| 3,352,394 A | 11/1967 | Longshore |
| 3,421,533 A | 1/1969 | Conn |
| 3,474,828 A | 10/1969 | Wheeler et al. |
| 3,485,225 A | 12/1969 | Bailey et al. |
| 3,533,431 A | 10/1970 | Kuenzel et al. |
| 3,536,085 A | 10/1970 | Taplin |
| 3,540,695 A | 11/1970 | Taylor |
| 3,587,647 A | 6/1971 | Walters |
| 3,598,148 A | 8/1971 | Kroffke |
| 3,601,149 A * | 8/1971 | Gilmore ................ F16K 31/36 137/484 |
| 3,635,436 A * | 1/1972 | Tillman ................ F16K 39/04 251/31 |
| 3,662,950 A | 5/1972 | McIntosh et al. |
| 3,683,694 A | 8/1972 | Granberg |
| 3,749,122 A | 7/1973 | Gold |
| 3,797,525 A | 3/1974 | Lieser |
| 3,913,620 A | 10/1975 | Pauliukonis |
| 3,917,220 A * | 11/1975 | Gilmore ................ F16K 3/16 251/86 |
| 3,949,645 A | 4/1976 | Masclet |
| 4,068,112 A * | 1/1978 | Marhic ................. H01J 37/18 219/121.22 |
| 4,220,174 A | 9/1980 | Spitz |
| 4,240,634 A | 12/1980 | Wiczer |
| 4,253,481 A | 3/1981 | Sarlls, Jr. |
| 4,263,938 A | 4/1981 | Peters |
| 4,281,677 A | 8/1981 | Hoffman |
| 4,336,946 A | 6/1982 | Wheeler |
| 4,396,071 A | 8/1983 | Stephens |
| 4,444,216 A * | 4/1984 | Loup .................. F16K 11/0655 137/115.15 |
| 4,450,869 A * | 5/1984 | Acker ................. F16K 11/065 137/625.25 |
| 4,456,028 A * | 6/1984 | Watson ............... F16K 17/0413 137/493 |
| 4,475,568 A * | 10/1984 | Loup .................. F16K 11/0655 137/115.15 |
| 4,491,154 A | 1/1985 | Peters |
| 4,493,335 A | 1/1985 | Watson |
| 4,506,693 A * | 3/1985 | Acker ................. F16K 3/188 137/116.3 |
| 4,554,940 A | 11/1985 | Loup |
| 4,793,590 A | 12/1988 | Watson |
| 4,856,557 A | 8/1989 | Watson |
| 4,877,057 A | 10/1989 | Christensen |
| 4,890,645 A | 1/1990 | Andersen |
| 4,968,197 A | 11/1990 | Chen |
| 5,035,265 A | 7/1991 | Chen |
| 5,069,240 A | 12/1991 | Kurkjian, Jr. |
| 5,190,078 A | 3/1993 | Stoll et al. |
| 5,222,521 A | 6/1993 | Kihlberg |
| 5,301,637 A | 4/1994 | Blount |
| 5,771,931 A | 6/1998 | Watson |
| 5,797,431 A | 8/1998 | Adams |
| 5,901,749 A | 5/1999 | Watson |
| 6,041,804 A | 3/2000 | Chatufale |
| 6,257,268 B1 | 7/2001 | Hope et al. |
| 6,264,206 B1 | 7/2001 | Hashizawa et al. |
| 6,296,008 B1 | 10/2001 | Boyer et al. |
| 6,318,400 B1 | 11/2001 | Hope et al. |
| 6,382,256 B2 | 5/2002 | Kim et al. |
| 6,520,478 B1 | 2/2003 | Hope et al. |
| 6,523,613 B2 | 2/2003 | Rayssiguier et al. |
| 6,651,696 B2 * | 11/2003 | Hope .................... F16K 17/046 137/469 |
| 6,668,861 B2 | 12/2003 | Williams |
| 6,702,024 B2 * | 3/2004 | Neugebauer .......... E21B 49/081 166/169 |
| 6,843,266 B2 | 1/2005 | Hope et al. |
| 6,901,960 B2 | 6/2005 | Roberts et al. |
| 6,983,803 B2 | 1/2006 | Watson et al. |
| 7,000,890 B2 | 2/2006 | Bell et al. |
| 7,073,590 B2 | 7/2006 | Neugebauer et al. |
| 7,159,605 B2 | 1/2007 | Thrash, Jr. et al. |
| 7,438,086 B2 | 10/2008 | Bento et al. |
| 7,520,291 B2 * | 4/2009 | Watson ................. F16K 17/046 137/81.2 |
| 7,520,297 B2 * | 4/2009 | Bell .................... G05D 16/0402 137/505.11 |
| 7,628,170 B2 | 12/2009 | Kok-Hiong et al. |
| 7,757,703 B2 * | 7/2010 | Bell .................... G05D 16/101 137/116.3 |
| 7,784,553 B2 | 8/2010 | Moreno |
| 7,959,161 B2 | 6/2011 | Seki et al. |
| 8,052,119 B2 | 11/2011 | Numazaki et al. |
| 8,245,729 B2 | 8/2012 | Zub |
| 8,246,055 B2 | 8/2012 | Asplund et al. |
| 8,342,202 B2 | 1/2013 | Nishio et al. |
| 8,397,742 B2 | 3/2013 | Thrash et al. |
| 8,408,244 B2 | 4/2013 | Gilcher |
| 8,453,678 B2 | 6/2013 | Neff et al. |
| 8,469,059 B1 | 6/2013 | Forst |
| 8,474,792 B2 | 7/2013 | Kubo et al. |
| 9,121,244 B2 | 9/2015 | Loretz et al. |
| 9,297,462 B2 | 3/2016 | Hattori et al. |
| 9,334,946 B1 | 5/2016 | Mason |
| 9,354,638 B2 | 5/2016 | Rebreanu et al. |
| 9,423,031 B2 * | 8/2016 | Weintraub ............. F16J 15/164 |
| 9,714,556 B2 * | 7/2017 | Olsen ..................... E21B 34/10 |
| 9,874,282 B2 | 1/2018 | Wetzel et al. |
| 9,879,799 B2 * | 1/2018 | Matteucci ............... E21B 33/03 |
| 10,100,607 B2 * | 10/2018 | Gostkowski ........... E21B 49/10 |
| 10,633,951 B2 * | 4/2020 | Martinez ................ E21B 34/02 |
| 10,739,796 B2 * | 8/2020 | Martinez ............... G05D 16/103 |
| 11,054,050 B2 * | 7/2021 | Weintraub ............. E21B 34/16 |
| 2004/0047748 A1 | 3/2004 | Roberts et al. |
| 2004/0173268 A1 * | 9/2004 | Dean .................... F16K 3/188 137/625.65 |
| 2004/0173976 A1 | 9/2004 | Boggs |
| 2004/0262007 A1 * | 12/2004 | Neugebauer .......... E21B 49/081 166/332.1 |
| 2005/0028864 A1 | 2/2005 | Thrash et al. |
| 2005/0067031 A1 | 3/2005 | Lee |
| 2005/0151099 A1 * | 7/2005 | Bell .................... E21B 33/0355 251/1.1 |
| 2006/0137744 A1 | 6/2006 | Anastas |
| 2006/0237064 A1 | 10/2006 | Benson |
| 2007/0000544 A1 | 1/2007 | Thompson |
| 2007/0069576 A1 | 3/2007 | Suzuki |
| 2007/0113906 A1 | 5/2007 | Sturman et al. |
| 2010/0044605 A1 | 2/2010 | Veilleux |
| 2010/0140881 A1 | 6/2010 | Matsuo |
| 2010/0154896 A1 | 6/2010 | Thrash, Jr. et al. |
| 2010/0243084 A1 | 9/2010 | Yoshioka et al. |
| 2011/0253240 A1 | 10/2011 | Otto et al. |
| 2012/0292550 A1 | 11/2012 | Meek |
| 2013/0032222 A1 | 2/2013 | Bresnahan |
| 2013/0037736 A1 | 2/2013 | Bresnahan |

(56) References Cited

U.S. PATENT DOCUMENTS

| | | |
|---|---|---|
| 2013/0146303 A1 | 6/2013 | Gustafson |
| 2013/0181154 A1 | 7/2013 | Robison et al. |
| 2014/0116551 A1 | 5/2014 | Smith |
| 2014/0377111 A1 | 12/2014 | Bagagli et al. |
| 2015/0060715 A1 | 3/2015 | Hoang |
| 2015/0152959 A1 | 6/2015 | Mangiagli et al. |
| 2015/0191996 A1* | 7/2015 | Weintraub ............ E21B 34/101 166/320 |
| 2015/0191997 A1* | 7/2015 | Weintraub ............ E21B 34/101 166/324 |
| 2015/0276072 A1 | 10/2015 | Rebreanu et al. |
| 2015/0276083 A1* | 10/2015 | Druhan ................... H02K 7/14 251/129.11 |
| 2015/0369002 A1 | 12/2015 | Patterson |
| 2016/0060996 A1* | 3/2016 | Patterson ............. F16K 17/046 166/368 |
| 2016/0103456 A1 | 4/2016 | Cho et al. |
| 2016/0123478 A1 | 5/2016 | Wetzel et al. |
| 2016/0230900 A1 | 8/2016 | Schulz et al. |
| 2016/0258531 A1 | 9/2016 | Ito et al. |
| 2016/0258537 A1 | 9/2016 | Heiderman et al. |
| 2017/0037984 A1 | 2/2017 | Frippiat et al. |
| 2017/0097100 A1 | 4/2017 | Patterson |
| 2017/0175916 A1* | 6/2017 | Huynh ................ F16K 11/0716 |
| 2017/0189730 A1 | 7/2017 | Ernfjall |
| 2017/0211710 A1* | 7/2017 | Patterson ............ F16K 31/1221 |
| 2017/0220054 A1 | 8/2017 | Zhu et al. |
| 2017/0241563 A1 | 8/2017 | Simpson |
| 2017/0260831 A1 | 9/2017 | Green |
| 2017/0314689 A1 | 11/2017 | Osterbrink et al. |
| 2017/0370481 A1 | 12/2017 | Glazewski |
| 2018/0016861 A1* | 1/2018 | Carrillo ................... E21B 33/06 |
| 2018/0073643 A1* | 3/2018 | Weintraub ............... F16K 3/243 |
| 2018/0073652 A1* | 3/2018 | Weintraub .......... F16K 11/0655 |
| 2019/0293196 A1* | 9/2019 | Weintraub .......... F16K 99/0001 |

OTHER PUBLICATIONS

PCT International Search Report and Written Opinion dated Jan. 31, 2018, for International Application No. PCT/US2017/051550.

PCT International Search Report and Written Opinion dated Jun. 23, 2015, for International Application No. PCT/US2014/062114.

PCT International Search Report and Written Opinion dated Nov. 14, 2019, for International Application No. PCT/US2019/046323, 13 pages.

* cited by examiner

PRESSURE RELIEF VALVE WITH BI-DIRECTIONAL SEAT

CROSS-REFERENCE TO RELATED APPLICATIONS

This application claims benefit of U.S. provisional patent application Ser. No. 62/867,691, filed Jun. 27, 2019, which is herein incorporated by reference.

BACKGROUND

Pneumatically and hydraulically operated equipment and control devices often incorporate, and are commonly interconnected to one another using, valves. Among these valves are relief valves, wherein a monitored fluid line is connected to an inlet of the relief valve, and the relief valve selectively opens to allow pressure in the monitored fluid line to vent from the monitored fluid line therethrough, through a relief valve vent opening connecting the relief valve to a vent, such as the local ambient pressure or a vent line. As a result, an overpressure condition in the monitored fluid line can be relieved. In these relief valve constructs, the relief valve commonly is connected to a spring housing, which provides a desired closing force against the fluid at pressure in the monitored fluid line to maintain the relief valve in the closed position when normal operating pressure is present in the monitored fluid line and thus preventing fluid flow form the monitored fluid line to the vent, and which force is insufficient to maintain the relief valve in the closed position once an undesirably high pressure is reached in the monitored fluid line and thus the relief valve opens to allow fluid in the monitored fluid line to flow to the vent. One such relief valve includes a piston having a shear seal element therein, the face of which faces a seal plate having a sealing face and an opening therethrough in fluid communication with the vent and commonly centered with respect to the sealing face thereof. A compressible element is present between the shear seal element and a bore in the piston within which the shear seal element is received and maintained. The compressible element is present to maintain the surface of the sealing face of the shear seal element against the sealing surface of the seal plate, the two sealing elements together forming a seal when in contact with one another and biased together, with the face of the shear seal element surrounding the opening in the sealing surface of the shear seal element. When the pressure of the fluid at the valve inlet, which is received through the inlet from the monitored fluid line and which fluid is in contact with the piston, creates a force on the piston greater than the force of the main spring holding the piston in place, the piston moves linearly to linearly move the shear seal element, and thus the sealing face thereof, past the opening in the seal plate, thereby allowing fluid to flow from the monitored fluid line and therethrough to vent. Thus, the fluid and pressure in the monitored fluid line can be relieved to the vent, and when the desired pressure is re-achieved in the monitored fluid line, the pressure of the fluid from the monitored fluid line against the piston is insufficient to maintain the piston in the retracted, vent open position, and the piston moves to again position the shear seal element over the opening in the seal plate.

Relief valves are constructed with a uni-directional seat bias, because the inlet pressure to the valve is used to bias the annular sealing face of the shear seal element against the shear plate to assist in the sealing off of the inlet pressure from the vent pressure during periods when normal pressure is present in the monitored fluid line, i.e., to maintain the sealing face of the shear seal element against the sealing surface of the seal plate in facing, sealing, contact. One issue encountered in this relief valve construct is the undesirable lifting off of the shear seal element from the seal plate occurring when the piston is in the valve closed position, which occurs as a result of an overpressure condition in the vent line causing the shear seal element to retract inwardly of the shear seal element bore in the piston. When this occurs, the sealing integrity of the relief valve is lost, and in some cases, the shear seal element can become cocked in the bore in a retracted position from the seal plate, and the shear seal element becomes resultantly seized in the piston, resulting in failure of the relief valve. One cause of such an overpressure condition is the connection of multiple valve outlets to the vent line, such that the vent line pressure can exceed the inlet pressure at the inlet to a relief valve connected thereto.

One attempt to overcome this issue is embodied in U.S. Pat. No. 6,651,696, wherein the shear seal element includes a through passage therein and thus the pressure is equal on either side of the shear seal element, even when the vent pressure is abnormally high. This can prevent the shear seal element from lifting off (i.e., backing away from), the seal plate, but the force of the sealing face of the shear seal element bearing against the sealing surface of the seal plate is insufficient to provide a reliable seal at that interface and the fluid in the monitored fluid line can leak past the sealing face of the shear seal element and the facing sealing surface of the seal plate, and thus to the vent.

Additionally, relief valves are commonly tested after their manufacture or refurbishment, to determine the inlet pressure at which the vent line will be exposed to the inlet pressure through the valve for a given spring force setting, commonly known as when the valve or seal of the valve seat "cracks" open. This testing can be performed by connecting the valve inlet to a variable pressure fluid source, raising the pressure at the valve inlet over a predetermined time period, and determining the occurrence pressure at which the seal of the valve cracks open, by the occurrence of fluid flowing through the valve vent passage or a change in the smooth rise of pressure being increased in the valve inlet, i.e., the monitored fluid line inlet. However, once the valve is installed in a fluid circuit, it becomes difficult or impossible to monitor the opening pressure of the relief valve in situ.

SUMMARY

Provided herein are relief valves wherein an overpressure condition in the vent bore has limited to no impact on valve performance, wherein a bi-directional seal is engaged between the shear seal element and a portion of the shear seal element bore. The shear seal element is received in a cross bore in the seal piston, which piston is biased inwardly of the valve body by a user settable bias spring, and the shear seal element includes an annular seal face having a first annular area, and an annular pressure leveraging face having an area at least twice that of the first annular area. Additionally, a seal element is provided surrounding the body of the shear seal element, in one aspect, in contact with the annular pressure-leveraging face of the shear seal element. The sealing element extends between the body of the shear seal element and the inner circumferential surface of the cross bore, to seal the inlet side pressure of the relief valve from the vent side pressure thereof.

Additionally, a relief valve having a mechanism to enable checking of the valve opening pressure in-situ, under valve operating ambient conditions, is provided. Here, a check valve is provided between the valve inlet and the piston of the valve, and is set to close off the inlet when the pressure in the interior volume of the valve is greater than the inlet pressure. A pumping port is provided through the body of the valve and it extends from the exterior of the valve into the interior volume thereof, on the side of the check valve opposite that of the inlet. A plug is normally maintained in this pumping port. However, to check the opening pressure of the valve, the pumping port plug is removed, and a variable fluid source is attachable to the pumping port to elevate the pressure in the inner volume of the valve to a value exceeding that of the check valve closing pressure vis a vis the inlet pressure, and to continue to raise that pressure to a pressure sufficient to cause movement of the piston to "crack" open the seal of the valve. The pressure being supplied into the valve interior volume is monitored to determine the pressure at which the valve opens in situ, and may be used to adjust the spring force on the piston to change the opening or "cracking" pressure of the valve, after which the opening pressure may be again checked by pumping fluid inwardly through the pumping port, which can be repeated until a desired opening pressure is achieved and the relief valve is thus properly calibrated.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
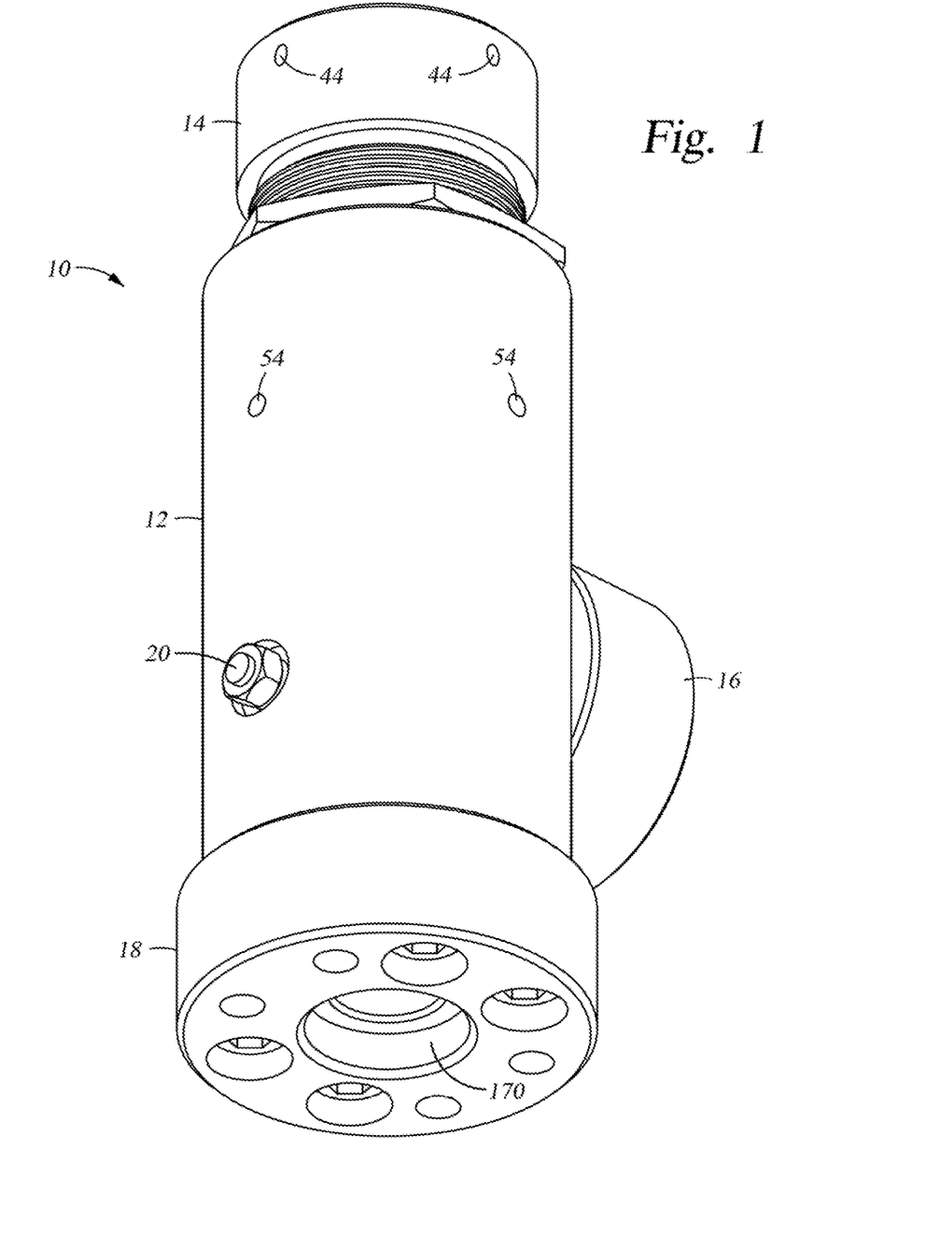
FIG. 1 is an isometric view of a relief valve.
Figure 2:
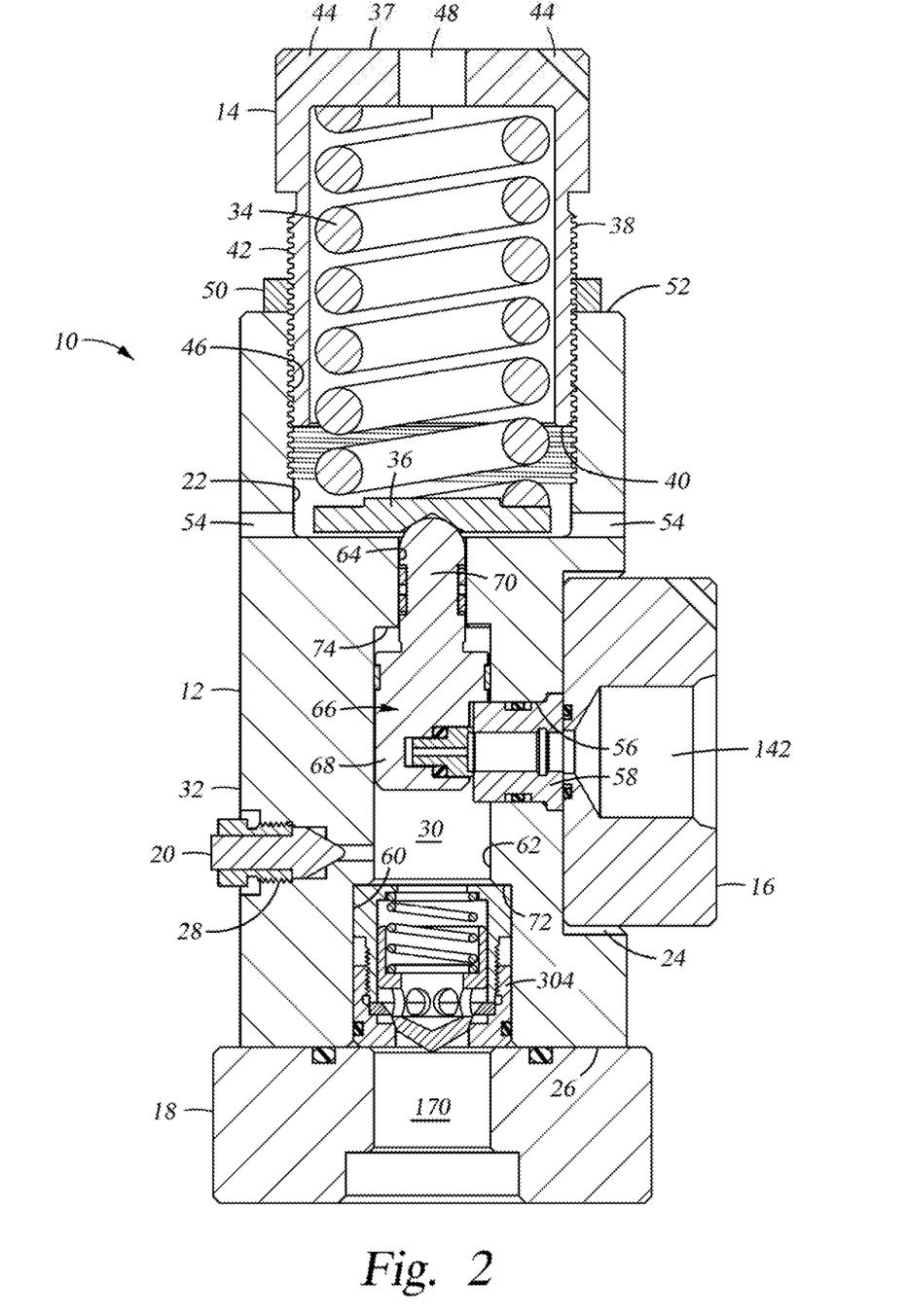
FIG. 2 is a sectional view of the relief valve of FIG. 1, showing the relief valve is the closed position.

Referring to FIGS. 1 and 2, the exterior of a relief valve 10 is shown, wherein the relief valve 10 includes a body 12, connected to which are a spring cap 14 received within, and connected to, a spring bore 22 (FIG. 2) of the body 12, such as by being threaded thereinto, a vent connector 16 received and secured in, a vent connector recess 24 (FIG. 2) extending inwardly of the body 12, an inlet connector 18 secured over the base 26 of the body 12, and a pumping port plug 20 releasably secured in an auxiliary pumping port 28 (FIG. 2) extending through the valve body 12 from the inner volume 30 to the outer surface 32 thereof. A spring 34 is provided within a volume formed of the spring bore 22 and the generally hollow interior of the spring cap 14, and a spring plate 36 is provided at the base of the spring bore 22. Spring cap 22 generally includes a cover portion 37 generally formed as a generally circular disk from which extends an annular sleeve 38 terminating at a distal annular end wall 40. The outer surface of the annular sleeve 38 includes a continuous thread or threads 42 running on the outer surface thereof in the direction from the distal annular end wall 40 and terminating before reaching the end of the spring cap 22, and a plurality of vents 44 in the form of openings extending through the annular sleeve 38 are disposed adjacent to the cover portion 36 end of the spring cap 14. The inner surface of the spring bore 22 is likewise threaded with inner threads 46 which mate with threads 42 on the outer circumferential surface of the annular sleeve 38. The spring plate 36 at the base of the spring bore is biased in the direction of the base of the spring bore 22 by the spring 34. The force of the spring 34 against the upper surface of the spring plate 36 is adjustable and is set by adjusting the compression of the spring 34, which here is configured as a coil spring. This adjustment is made by rotating the spring cap 14 with respect to the body 12 of the valve 10, such that the distance between the inner surface of the cover portion 37 and the base of the spring bore 22 is changed by threading the spring cap 22 inwardly or outwardly of the spring bore 22. To readily achieve this movement, a contoured opening 48 extends through the cover portion 36 of the spring cap 14, and here it is configured as the female side of a hex connection, wherein a hex wrench having six equal sides may be inserted thereinto and pushed or pulled to rotate the spring cap 14 with respect to the body 12 Additionally, a lock nut 50, having a generally circular inner opening having threads which mate with the threads 42 on the outer surface of the spring cap 14 is provided over the annular sleeve and threaded thereto. Once the desired location of the spring cap 14 is achieved with respect to body 12 and the base of the spring bore 22, i.e., the proper spring force or compression has been set, the nut 50 is rotated to bring it to bear against the upper circumferential surface 52 of the body, to lock the spring cap 14 location with respect to the body 12. Additionally, a plurality of secondary vent holes 54 (two shown) extend through the wall of the spring cap 22.

Vent connector 16 extends inwardly of vent connector recess 24 and is secured therein such as by a plurality of fasteners extending through the vent connector 16 and into corresponding threaded holes in the body 12, by being threaded therein, or other mechanism. A seal plate opening 56, into which a seal plate adaptor 58 is received, extends inwardly of the body from generally the center of the vent connector recess 24 and into the inner volume 30 of the body 12. The inner volume 30 of the body 12 further includes a central bore region, including a first bore 60 having a first opening area, a second bore 62 having a second opening area, and a third bore 64 having a third opening area. In this aspect, a piston 66, having a first portion 68 and a second portion 70, reciprocally extends within the second and third bores 64, 66, such that the first portion 68 is located within, and is reciprocally movable within, a portion of the second bore 62, and the second portion 70 extends within a portion of the second bore 62 and in the third bore 64, and inwardly of the spring bore 22 at one end thereof. The first bore 60 opening area (i.e., cross sectional area) here is larger in cross section than the second bore 62 opening area, which in turn is larger in cross section than the third bore 64 opening area. Here, the bores 62, 62, 64 have a circular, within machining tolerance, circumference, wherein the diameter of the first bore 60 is greater than the diameter of the second bore 62 with is larger in diameter of the third bore 64. Resultantly, a first annular ledge 72 is present and extends between the first bore 60 and the second bore 62 inwardly of the body 12, and a second annular ledge 74 (FIG. 3) is present and extends between the second bore 62 and the third bore 64 inwardly of the body 12 and is located between the first annular ledge 72 and the spring bore 22.

Figure 3:
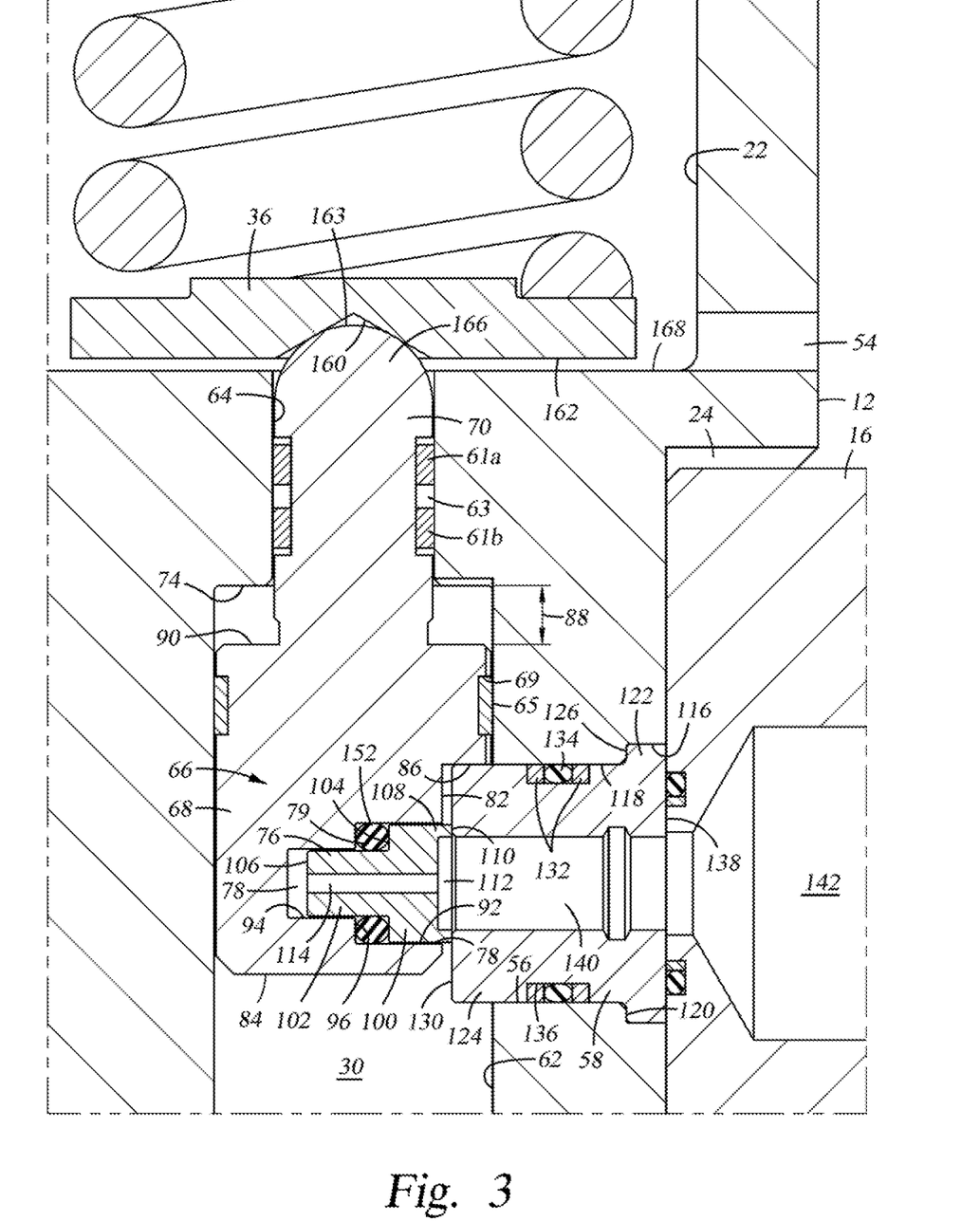
FIG. 3 is an enlarged sectional view of a the shear seal elements of the valve of FIG. 1.

FIG. 3 depicts the basic interactive structure of the piston 66, seal plate adaptor 58 and a shear seal element 76 received within a shear seal element bore 78 in the piston 66. Piston 66, includes the first portion 68 from which second portion 70 extends, each of which has a circular, within machining tolerances, circumference or cross section, wherein the circumference of the first portion 68 is one to 3 thousandths of an inch less than that of the second bore 62, and wherein the circumference of the second portion 70 is one to 3 thousandths of an inch less than that of the third bore 64, allowing sliding motion of the first and second portions 68, 70 of the piston 66 within the second and third bores 62, 64 respectively. First sealing guide shims 61a, b are received in an annular groove 63 extending around the second portion 70, and help center the second portion 70 in the third bore, and a second sealing guide shim 65 is received in a groove 69 extending inwardly of the circumference of the first portion 68 of the piston 66, and helps center the second portion 68 in the second bore 62. Sealing shims 61a, b and 65 also seal the annular gap between the outer surfaces of the first and second portions 68, 70 of the piston 66 and the inner walls of the second and third bores 62, 64, to seal off the open area (spring bore 22) of the spring cap 14, which is at the ambient pressure surrounding the relief valve 10, from the central bore region of the body 10, i.e., the volume of the second bore 62 in the region of the second bore 62 between the second guide shim 65 and the first annular ledge 72 and the volume of the first bore 60. Additionally piston 66 includes a flatted portion 82, extending across the outer circumference thereof from the end 84 of the piston 66 distal of the second portion 70 to a limit ledge 86 extending generally perpendicularly to flatted portion 82. The distance between the closest location of the seal plate adaptor to the second annular ledge 74, less the distance between the limit ledge 86 and an annular wall 90 at the change in piston 66 circumference between the first and second portions thereof, defines the maximum stroke distance of the piston 66 within the second and third bores 62, 64.

Shear seal element bore 78 of the piston 66 includes a major bore 92 opening at the flatted portion 82, and a minor bore 94 extending along the centerline of the major bore further inwardly of the piston 66 therefrom, and connected by an annular bore ledge 96. Shear seal element 76 includes a corresponding major portion 100 received within the major bore 92, a minor portion 102 received within the minor bore 94, and an annular shear seal element ledge 104 interconnecting the major and minor portions 100, 102. Shear seal element 78 further includes a minor side face 106, a major side end 108 having an annular seal face 110 surrounding a recess 112, and a central shear seal element bore 114 extending from recess 112 thorough the minor side face 106.

Body 12 further includes the seal plate opening 56, into which the seal plate adaptor 58 extends from the base of the vent connector recess 24 through the wall of the body 12 and to the second bore 68. Seal plate opening 56 includes a major seal plate opening bore 116 and a minor seal plate opening bore 118, and an annular seal plate adaptor bore ledge 120 interconnecting the inner circumferential surfaces of the major seal plate opening bore 116 and minor seal plate opening bore 118. Seal plate adaptor 58 likewise includes a major seal plate adaptor portion 122 received in the major seal plate opening bore 116, a minor seal plate adaptor portion 124 received in the minor seal plate opening bore 118, and an annular seal plate adaptor ledge 126 connecting the surface of the major seal plate adaptor portion 122 to the surface of the minor seal plate adaptor portion 124. Here, the major seal plate opening bore 116 and minor seal plate opening bore 118 are, within machining tolerances, circular in section, and the major seal plate adaptor portion 122 and the minor seal plate adaptor portion 124 are likewise here, within machining tolerances, circular in section, having a circumference 1 to 3 thousandths of an inch less than that of the major seal plate opening bore 116 and minor seal plate opening bore 118 to allow the minor seal plate adaptor portion 124 to be slid into the seal plate opening 56 until the annular seal plate adaptor ledge 126 abuts the annular seal plate adaptor bore ledge 120, thus positioning the circular end face of the seal plate adaptor 58 forming the seal plate surface 130 thereof inwardly of the second bore, in a spaced facing relationship with the flatted portion 86 of the piston 66, such that the limit ledge 86 of the piston overlies, and is limited in motion in the direction away from the spring bore 22, by the portion of the minor seal adaptor portion 124 extending inwardly of the second bore 68, and the annular seal face 110 of the shear seal element 76 faces and contacts the seal plate surface 130. A seal groove 136 extends inwardly of the circumferential surface of the minor seal plate adaptor portion 124, and a seal ring 134, and backing rings 132 on opposed sides thereof, are received in the seal groove 136 to provide a seal across the small annular gap between the outer circumferential surface of the minor seal plate adaptor portion 124 and the inner circumferential surface of the minor seal plate opening bore 118. Seal plate adaptor 58 further includes a rear wall 138, facing away from seal plate surface 130 and on an opposed end surface of the seal plate adaptor 58 therefrom, and a through vent bore 140 extends through the seal plate adaptor 58 from and through rear wall 138 and to and through seal plate surface 130. Vent connector 16 includes a vent opening 142 therein which fluidly communicates with the through bore 140 of the seal plate adaptor 58 which in turn, in the relief valve closed position shown in FIG. 3, communicates with the recess 112 and central shear seal element bore 114 to communicate ambient pressure around the valve body 12, or a vent line pressure where a vent line (not shown) is connected to the vent opening 142, to a volume between base wall 158 (FIG. 4) of the minor bore 94 of the shear seal element bore 78 and the minor portion 102 of the shear seal element 76. The vent connector 16 contacting the rear wall 138 of the seal plate adaptor 58 prevents backing of the seal plate adaptor 58 from the seal plate opening 56 to maintain the proper position of the seal plate surface 130 within the second bore 62 of the valve body 12.

Figure 4:
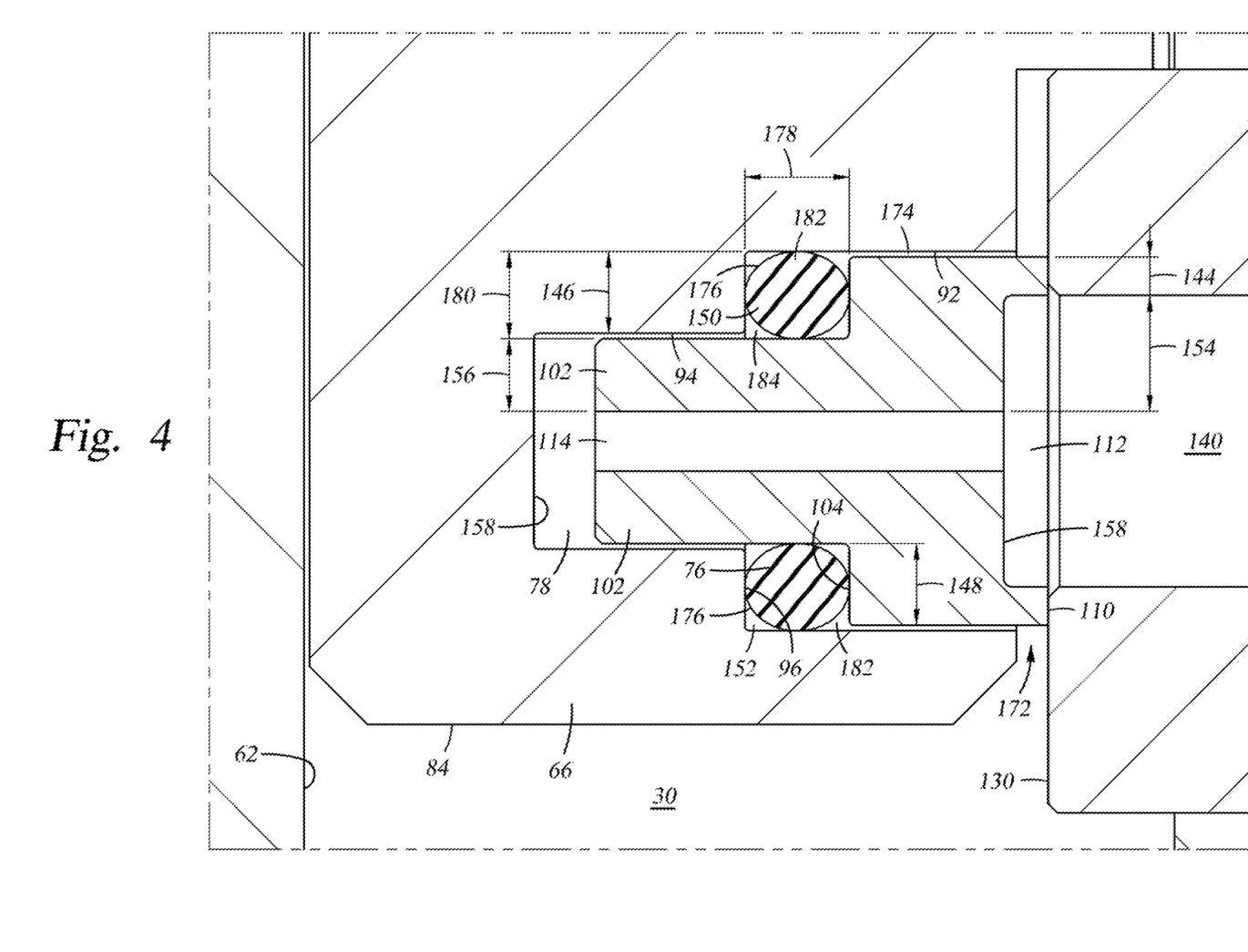
FIG. 4 is an enlarged sectional view of a the shear seal elements of the valve of FIG. 3.

Referring to FIG. 4, the relative sizes of the regions of the shear seal element bore 78 and the annular seal face 110 are shown and described. In this aspect of the relief valve 10, the annular seal face 110 has a radial width 144, defining a first seal face surface area. Annular bore ledge 96 has a bore ledge radial width 146 defining a bore ledge area, and annular shear seal element ledge 104 has a radial width 148 defining an annular shear seal element ledge area. The annular bore ledge 96 is separated from the annular shear seal element ledge 104 by a gap 152, in which a circumferential biasing seal 150, such as an O-ring, is disposed and contacts and biases apart the annular bore ledge 96 and the annular shear seal element ledge 104 across the gap 152. When the pressure in the second bore 62 is greater than that in the vent bore 140, the biasing seal 150 surrounds and sealingly contacts the outer surface of the minor portion 102 of the shear seal element 76 and can become spaced from, i.e., can be lifted off of, the surrounding surface of the major bore 92 in the gap 152, and can lift off of the annular shear seal ledge 104. The outer diameter of the annular seal face 110 is greater than the inner diameter of the vent bore 140, ensuring that a portion of the annular seal face 110 can surround the opening of the vent bore 140 into the second bore 62. To ensure sealing of the interface of the seal plate surface 130 and the annular seal face 110, the radial width 144 the annular seal face is chosen such that the annular shear seal ledge area of the annular seal shear ledge 104 is greater than the resulting first seal face surface area of the annular seal face 110, such that the second bore pressure 62 on the annular seal ledge 104 forms a pressing force to push annular seal face 110 toward the seal plate surface 130 greater than that tending to push the shear seal element 76 away from the seal plate surface 130. Likewise, the radial width 146 of the annular bore ledge 96 is chosen such that the resulting second seal face surface area is greater than the surface area of the annular seal face 110.

The minor side face 106 of the shear seal element 76 is an annular surface having a radial width 156 establishing a first vent pressure biasing area on the shear seal element. The presence of the biasing seal 150 maintains the vent pressure on the minor side face 106 while preventing the second bore 62 pressure from reaching the minor side face 106. The base of the shear element bore 78 is an annular wall 158 having a radial width 154 greater than that minor side face establishing a second vent pressure biasing area. A small annular area of the annular seal face 110 directly adjacent to the recess 112 is, in the relief valve fully closed position of FIGS. 1 to 4, likewise exposed to vent pressure and thus forms a third vent pressure biasing area. As the second and third vent pressure biasing areas are, in sum, greater than that of the first vent pressure biasing area on the minor side face 106, vent pressure tends to push the shear seal element 76 away from the shear plate adaptor 58, or in other words, tends to lift the seal surface 110 off of the seal plate surface 130. In contrast, the monitored fluid line pressure present in the second bore 62 communicates through a first annular passage 174 between the major portion 100 of the shear seal element 76 and the major bore 92 to maintain monitored fluid line pressure on the annular shear seal element ledge 104, to push the annular seal face 110 into engagement with the shear plate 130 surface. By ensuring the area of the annular shear seal element ledge 104 is at least twice that of the annular seal face 110, a safety margin is built into the seal arrangement for the relief valve to maintain the shear seal element 76 against the seal plate adaptor 58, even when the vent pressure rises to that of, or slightly more than, the pressure in second bore 62 which is a monitored or protected line pressure.

A seal gland 176 is formed in the gap 152 bounded by the annular bore ledge 96, the annular shear seal element ledge 104, and portions of the outer circumferential surface of the minor portion 102 of the shear seal element 76 and of the major bore 92 of the shear seal element bore 78 extending therebetween. The biasing seal 150 here is an O-ring circumscribing the shear seal element 76 within the seal gland 176. In its non-compressed state, the biasing seal 150 has a nominally, within manufacturing tolerance, circular cross section, and the seal gland 176 has a generally rectangular cross section, having a width 178 which is less than the diameter of the biasing seal 150 in its free, unbiased state and a radial depth which is likewise less than the diameter of the biasing seal 150 in its free and unbiased state. For example, the width 178 of the seal gland 176 is approximately 95% the diameter of the biasing seal 150 in the free, unconstrained, state of the biasing seal 150, and the depth 180 of the seal gland 176 is approximately 83% the diameter of the biasing seal 150 in the free, unconstrained, state of the biasing seal 150. Thus, when the shear seal element 76 is assembled into the shear seal element bore 78 of the piston 66, and the shear seal element 78 contacts the seal plate adaptor 58, the biasing seal 150 is compressed into an ovoid shape as shown in FIGS. 2 to 6, such that the biasing seal 150 is compressed into four flatted regions at the contact therewith with each of the annular bore ledge 96, the annular shear seal element ledge 104, and portions of the outer circumferential surface of the minor portion 102 of the shear seal element 76 and of the major bore 92 of the shear seal element 76, and curved outer portions between adjacent flatted areas thereof. As shown in FIG. 4, the biasing seal 150 separates a monitored fluid line pressure annular area 182 when the valve is assembled and not under pressure at the inlet or vent initially bounded by surfaces of the biasing seal 150 extending between annular bore ledge 96 and the annular wall of the major bore 92, and a vent pressure annular area 184 initially bounded by surfaces of the biasing seal 150 extending between the major bore 92 and the annular shear seal element ledge 104 of the shear seal element 76.

During use, the pressure in the monitored fluid line communicated to the second bore 62 through the first bore 60 and the inlet 170 in the inlet connector 18 may experience a pressure increase sufficient to cause the piston 66 to move in the direction of spring bore 22, causing the annular seal face 110 to likewise move in the direction of spring bore 22. The spring plate 36 includes a generally planar lower face 162, having a central conical detent 160 extending thereinto. The second portion 70 of the piston 66 includes, at the terminal end thereof opposed to the first portion 68 of the piston 66, a hemispherical end portion 166 sized to be received within and engage the internal surface of the conical detent 160, which resultantly causes circumferential line contact between the hemispherical surface of the end portion 166 and the surface of the conical portion 160. This allows the spring plate 36 and the lower face 162 thereof, if moved away from the base wall 168 of the spring bore 22, to tilt or move into a non-parallel relationship with the base wall 168 which occurs because the spring may load only against a portion of the spring plate 36. As this movement of the piston 66 continues, the maximum movement of the piston from the position thereof in FIGS. 1 to 4 is shown in FIG. 5, whereby the annular wall 90 of the piston abuts against, and is limited from further movement in the direction away from first bore 60 by contact with, the second annular ledge 74.

Figure 5:
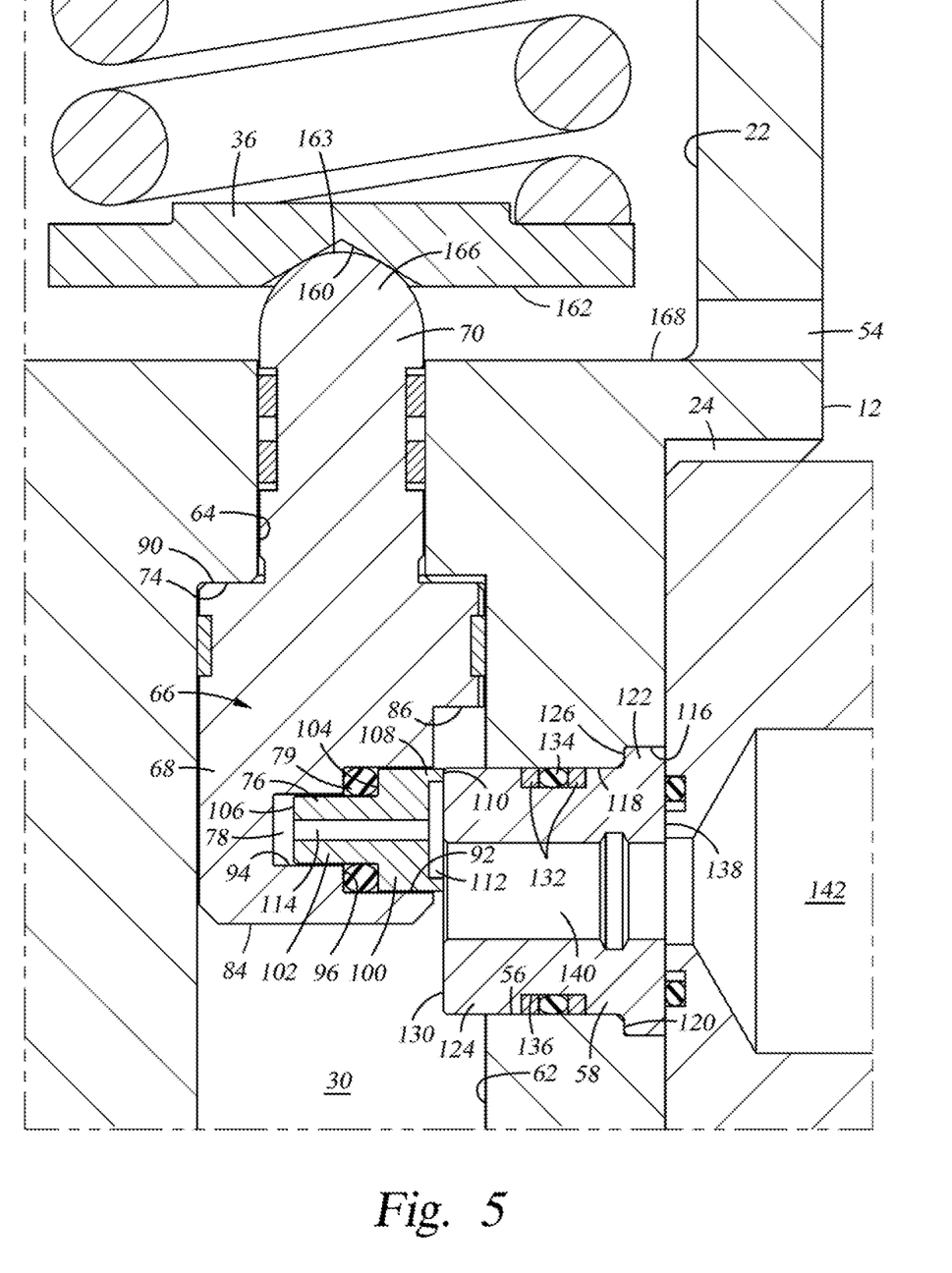
FIG. 5 is an enlarged sectional view of a the shear seal elements of the valve of FIG. 1 in the fully open condition.
Figure 6:
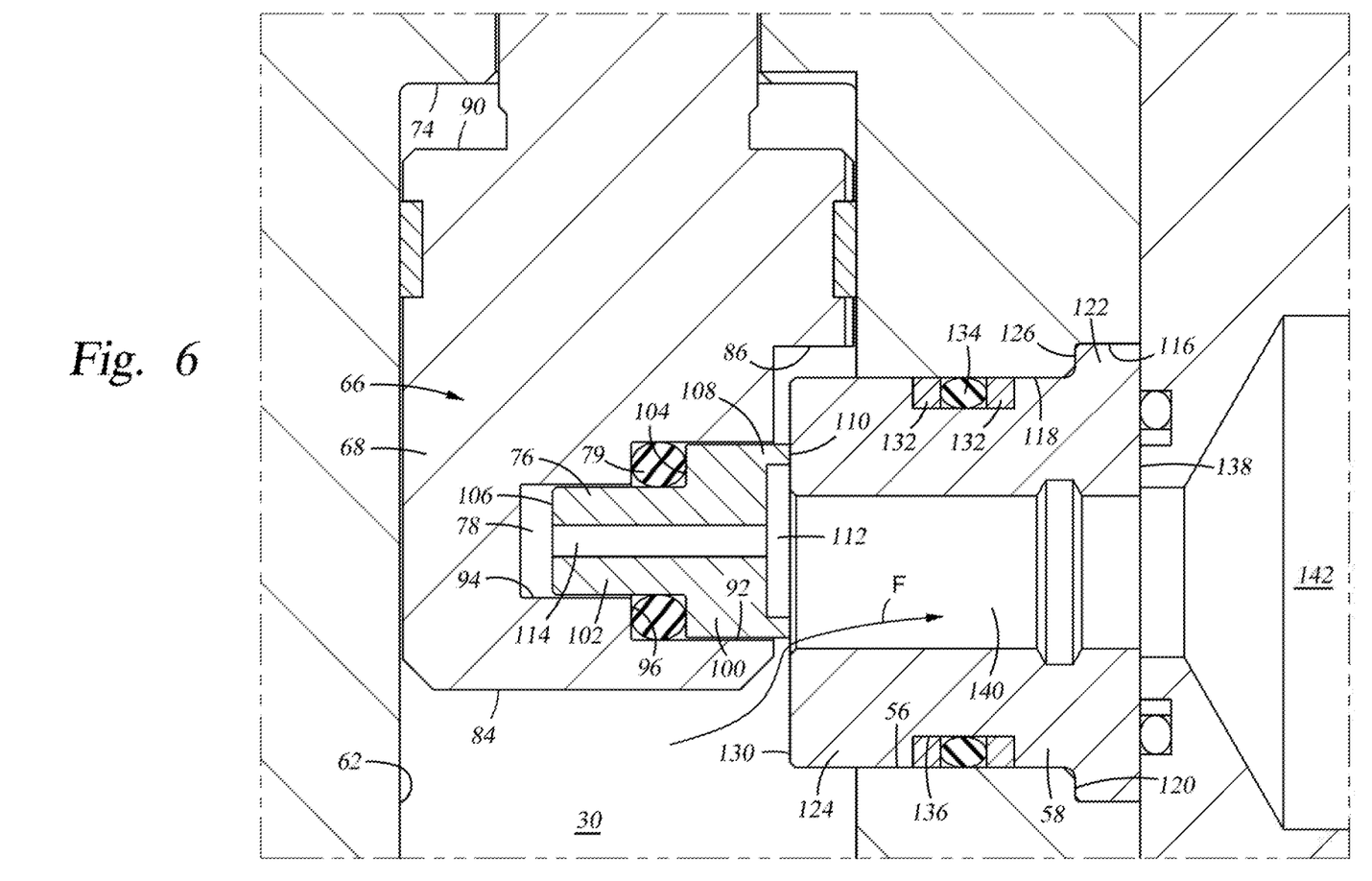
FIG. 6 is an enlarged sectional view of a the shear seal elements of the valve of FIG. 1 as the valve is transitioning from a fully closed to an open condition.
Figure 7:
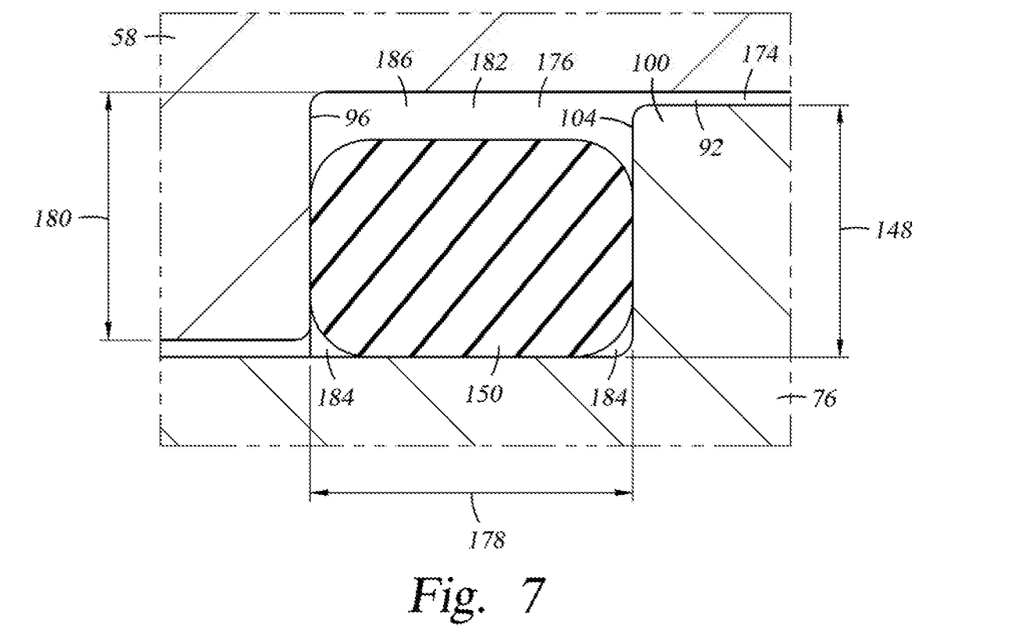
FIG. 7 is an enlarged view of the seal gland of the shear seal elements of the valve of FIG. 1, showing the biasing seal therein during a high pressure condition in the line to which the valve is connected, i.e., the monitored fluid line.
Figure 8:
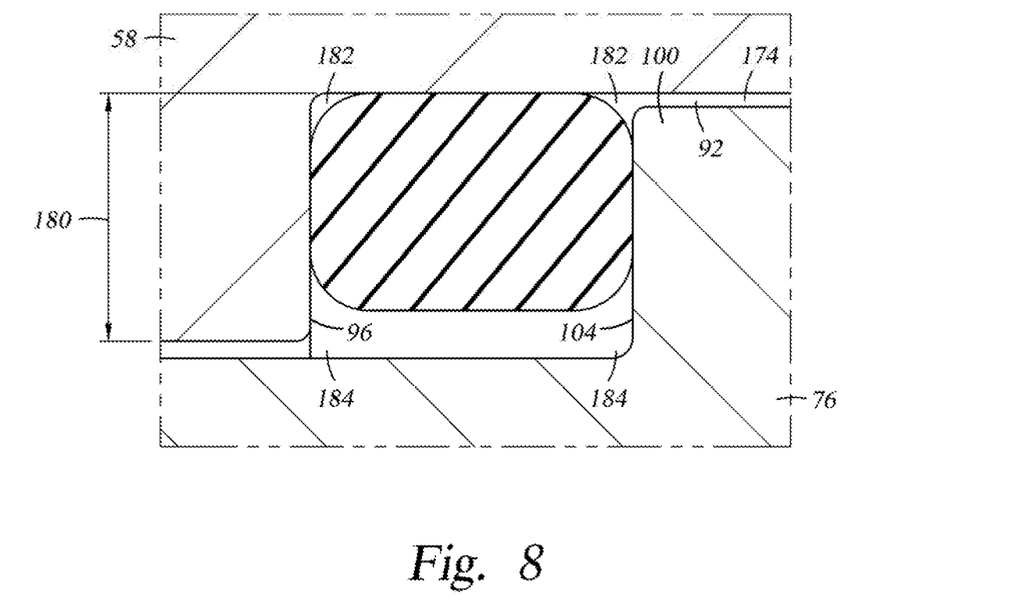
FIG. 8 is an enlarged view of the seal gland of the shear seal elements of the valve of FIG. 1, showing the biasing seal therein during a high pressure condition in the vent to which the relief valve vents an overpressure condition in the monitored fluid line.

The position and biasing functionality of the circumferential biasing seal of FIGS. 2 to 6 during valve use and operation is shown in FIGS. 7 and 8. Here, in FIG. 7, the vent pressure is at a low ambient pressure, for example atmospheric air pressure where the vent is open to the earth's atmosphere, or the water pressure at the depth of the valve installation location, and the valve 10 bore area, including the first and second bores 60, 62, is charged with a monitored fluid line pressure greater than the pressure of the vent. In this condition, the pressure in second bore 62 communicates through a gap 172 between the shear seal element 76 and the seal plate surface 130 (FIG. 4), thence along or through the annular passage 174 between the major portion 100 of the shear seal element 76 and the major bore 92 and thence into the monitored fluid line annular pressure area 182 of the seal gland 176. This high pressure compresses the biasing seal 150 radially inwardly such that the biasing seal 150 no longer contacts the major bore 92. The monitored fluid line pressure is thus present between the biasing seal 150 and the major bore 92 of the shear seal element bore 78. As the monitored fluid line pressure is originally present at monitored fluid line pressure annular area 182 (FIG. 4), it is believed that the increase in monitored fluid line pressure further compresses the biasing seal 150 into the shape of the seal gland 174 leaving an outer circumferential gap 186 between the surface of the biasing seal 150 facing away from the minor portion 102 of the shear seal element 76 and the inner surface of the major bore 92. The pressure in this outer circumferential gap 186 compresses the biasing seal such that the force exerted by the biasing seal 150 against the annular bore ledge 96 and opposed annular shear seal element ledge 104 is increased to approximately the pressure value of the monitored fluid line pressure, such that the compressed biasing seal biases against an area at least twice the annular area of the annular seal face 110 at or nearly at the increased vent pressure to maintain the seal between seal face 110 and the seal plate surface 130.

In contrast, as shown in FIG. 8, vent pressure is communicated through the seal element bore 114, between the region between the base of the minor bare and the minor side face 106 of the shear seal element 76, through a second annular passage 190 and thence to the vent pressure annular area 184. When an overpressure condition occurs in the vent and this pressure sufficiently exceeds the pressure in the monitored fluid line, this higher pressure pushes the biasing seal outwardly and extends the vent pressure annular area 184 and is believed to flatten or compress the biasing seal 150 against the inner circumferential surface of the major bore 92, and the vent pressure compressing the biasing seal causes the pressure or force applied by the biasing seal 150 against the annular shear seal element ledge 104 to be approximately that of the vent pressure, and the area of the annular shear seal element ledge 104 exposed to the vent pressure is greater than the area of the seal face 110 contacting the seal plate surface 130. By sizing the annular shear seal element ledge 104 to have an area at least twice that of the annular seal face 110, maintenance of a seal between seal face 110 and the seal plate surface 130 is maintained because the area of the annular shear seal element ledge 104 is at least twice as large as the area of the annular seal face 110 facing the seal plate surface 130, and an exposed portion of the annular shear seal element ledge 104 is also exposed to the higher vent pressure as well as the increased force of the biasing seal 150 which is now at, or near, the increased vent pressure likewise pushing against the shear seal element ledge 104 in the direction of the seal plate surface 130.

As the piston begins moving from the valve fully closed position of FIG. 4 toward the fully opened position of FIG. 5, when the initial movement distance exceeds the radial width 144 of the annular seal face 110, at the point in time the lowermost portion of the major portion 100 moves past the lowermost portion of the bore 140 of the seal plate adaptor 58, also known as when the seal "cracks", the second bore 62 will become exposed to the vent bore 142 through the bore 140 of the seal plate adaptor 58, and fluid will be vented from the second bore and thus from a monitored fluid line fluidly connected to the valve through the inlet bore 170 in the inlet connector 18 to relieve the pressure in the monitored fluid line as shown by arrow F in FIG. 6.

Figure 9:
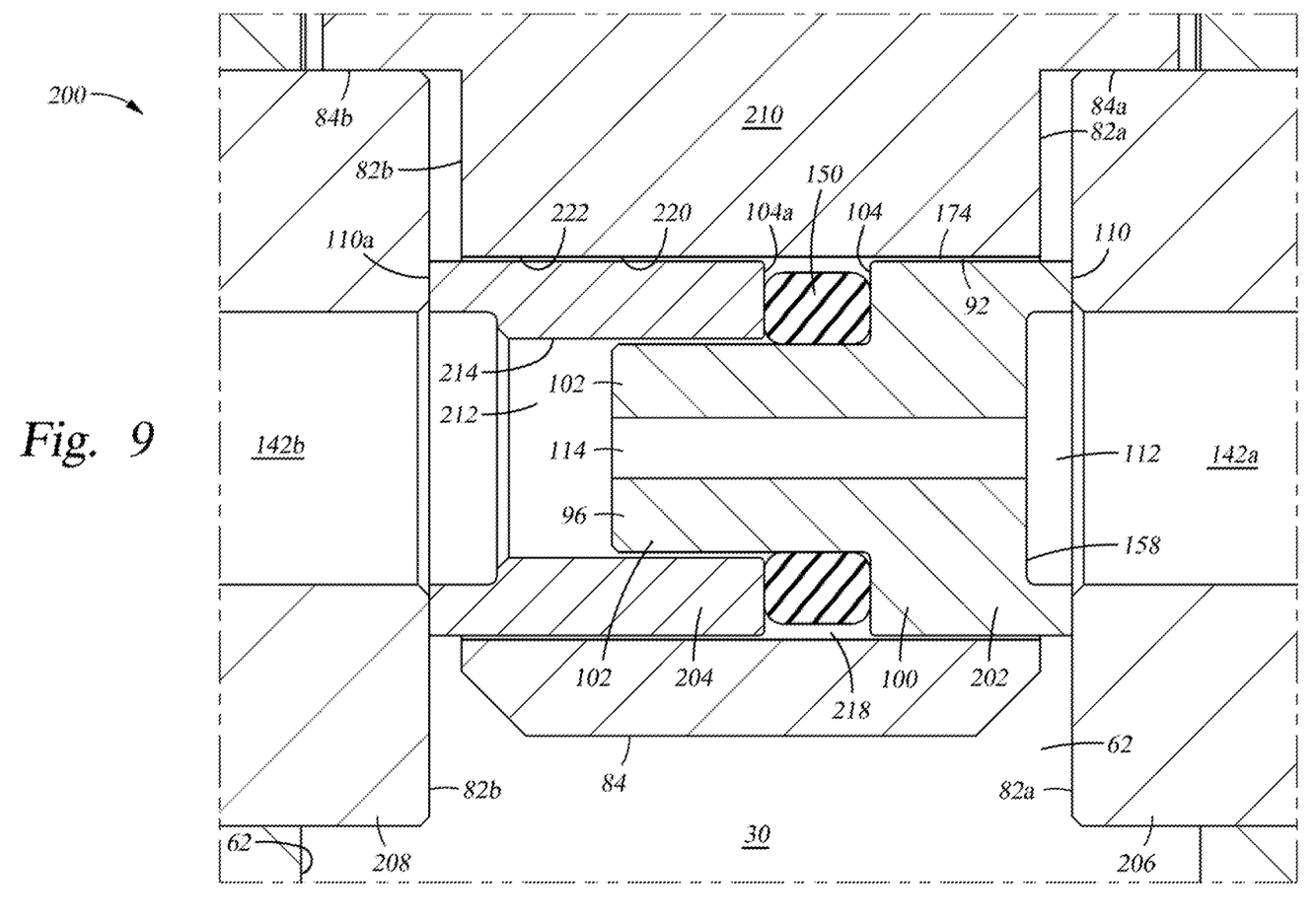
FIG. 9 is an enlarged sectional view of a bi-directional shear seal useful with an alternative relief valve construct.

FIG. 9 is a partial sectional view of an additional relief valve construct, showing a bi-directional sealing element therein. Here, in contrast to the relief valve 10 of FIGS. 1 to 6 wherein the vent pressure is located at a single port of the valve, here vent pressure openings are located at opposed sides of the valve and aligned with one another over the width of the valve body. The structure of the valve and the components thereof having the bi-directional sealing element are structurally the same as those having the uni-directional sealing element, except as shown in FIG. 9.

Here, to form the bi-directional relief valve 200, valve 10 of FIGS. 1 to 6 is modified such that two shear seal assemblies, here first and second shear seal assemblies 202, 204, and two, here first and second, seal plate adaptors 206, 208 are used, and the piston hereof has generally the same construct as piston 66, except here it is a dual flatted piston 210 which is modified to include opposed flatted portions 82*a, b* and limit ledges 84*a, b*. First shear seal assembly 202 is configured substantially the same as shear seal assembly 76 of valve 10, and includes the annular seal face 110 and annular shear seal element ledge 104 having the same relative dimensions as those in valve 10, and the biasing seal 150 having the same relative dimensions to the annular seal face 110 and annular shear seal element ledge 104 as it does in relief valve 10. In contrast to the relief valve 10, bi-directional relief valve 200 includes a second shear assembly 204 having a second annular seal face 110*a* and second annular shear seal element ledge 104*a*, and a through bore 212 having an inner surface 214 having a circumference or diameter slightly greater than the outer circumference or diameter of the minor portion 102 of the first shear seal assembly 202. Dual flatted piston 210 also includes, in contrast to piston 66, a through shear seal bore 220 having an inner circumferential surface 222 having a diameter or circumference. The space between the annular shear seal element ledges 104, 104*a*, and the portions of the inner circumferential surface 222 of the shear seal bore 220 and of the minor portion 102 of the first shear seal assembly 202 extending between the annular shear seal element ledges 104, 104*a* forms a bi-directional seal gland 218. Additionally, here biasing seal 150 is present in the bi-directional seal gland, and where the valve is not under pressure, i.e., not installed, the biasing seal 150 forms four flatted portions contact the four surfaces defining the bi-directional seal gland 218, similarly to the biasing seal 150 in FIGS. 2 to 6.

The bi-directional seal of the valve 200 operates substantially the same way as that of valve 10, except here two vent bores 142*a*, 142*b* are collinearly provided on opposed sides of the valve body, and when the valve 200 is in the fully closed position, vent bore 142a is aligned with recess 112 within the circumference of annular seal face 110, and vent bore 142b is aligned with through bore 212. In this condition, pressure in the monitored fluid line is present in the second bore 62, and communicates in the small clearance between the inner circumferential surface 222 of the shear seal bore 220 of the dual flatted piston 210 and the facing outer circumferential surfaces of the major portion 100 of the first shear seal 202 assembly and the outer circumferential surface of the second shear seal assembly 204, to load the biasing seal 150 as shown in FIG. 7 when a high pressure is present in the monitored fluid line. When an overpressure condition is present in the vent bores 142a, b, through the small clearance between the minor portion 102 of the first shear seal assembly 202 and the inner surface 214 of the second shear seal assembly, to load the biasing seal such that the biasing seal is spaced from the outer circumferential surface of the minor portion 102 of the first shear seal assembly 202 and further biased against as the inner circumferential surface 222 of the shear seal bore 220, similarly to the pressure biased position of the biasing seal as shown in FIG. 8. Again the surface area of the annular surfaces of each of the annular shear seal element ledges 104, 104a is at least twice that of the annular surface area of each of the annular seal faces 110, 110a, and the loading effect resulting from the annular seal element ledge being at least twice as large in area as the annular seal face 110 of the aspect hereon shown and described with respect to FIGS. 2 to 8 is also achieved here.

Referring again to FIGS. 1 and 2, relief valve 10 further includes the auxiliary pumping port 28 extending from, and fluidly connecting, the exterior of the relief valve body 12 to the second bore 62 within the relief valve body 12, within which a removable pumping port plug 20 is locatable and is configured to seal off fluid flow through the auxiliary pumping port 28, and a check valve assembly 304 received in first bore 60 and secured therein between first annular ledge 72 and the facing surface of the inlet connector 18 secured over the base 26 of the body 12. First bore 60 and an inlet bore 170 extending through the inlet connector 18 are aligned for fluid communication therebetween. Inlet connector 18 is secured over the base 26 of the body by, for example threaded fasteners, a clamp, or other attachment mechanism. As will be described further herein, the cracking pressure of the valve, or the shear seal therein, may be tested using the auxiliary pumping port 28 to increase the pressure in the second bore 62 independently of the pressure in the vent opening 142 in the vent connector 16 and the pressure in the monitored fluid line fluidly communicated to the second bore 62 through the inlet bore 170.

Figure 10:
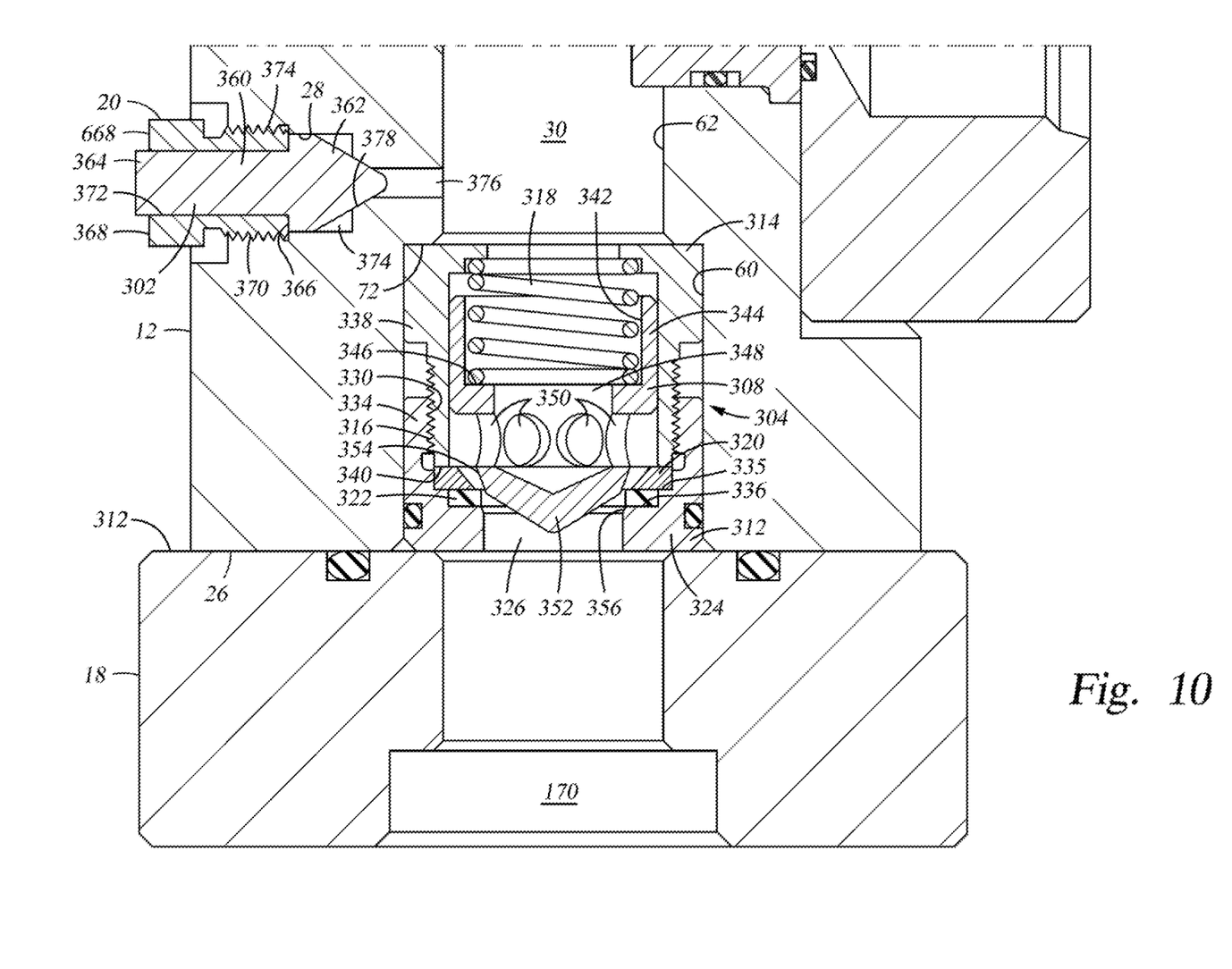
FIG. 10 is an enlarged sectional view of a portion of the valve of FIG. 1, showing elements of the in situ pressure checking elements thereof.
Figure 11:
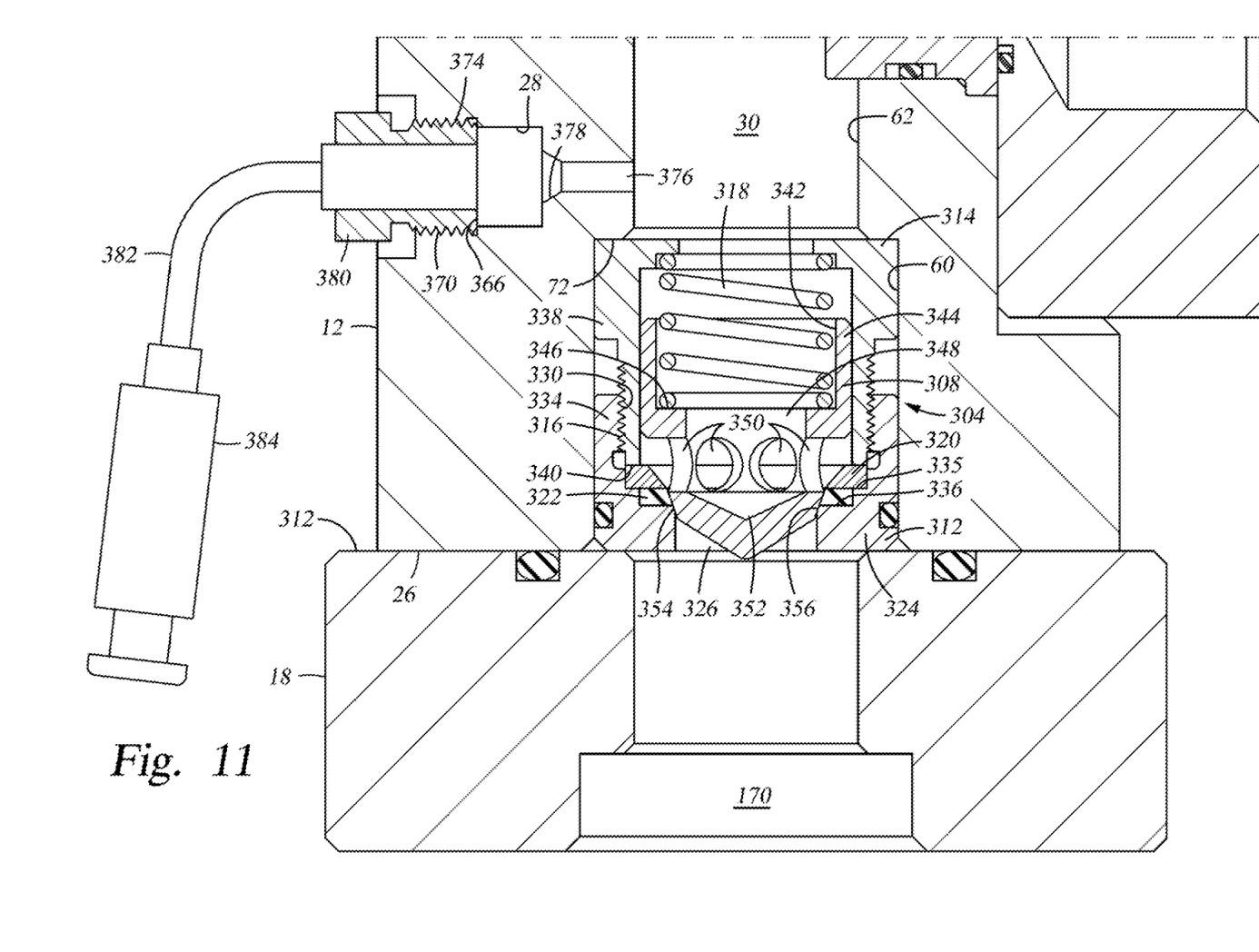
FIG. 11 is an enlarged sectional view of a portion of the valve of FIG. 1, showing a pump fluidly connected to the internal bore thereof.

Referring to FIGS. 11 and 12, the check valve assembly 304 and auxiliary pumping port region of the valve are shown enlarged and in section. In FIG. 11 the closure element 308 of the check valve assembly is in the closed position as also shown in FIG. 2, and in FIG. 10 the closure element 308 of the check valve assembly 304 has been moved to a valve open condition in contrast to the check valve closed position of FIGS. 2 and 11. Here, check valve assembly 304 is received within the first bore 60 of the valve body 12, and held between the first annular ledge 72 at the interface of the first and second bores 60, 62, and the body facing surface of the inlet connector 18 extending across the circumference of the opening of the first bore 60 at base 26 of the body 12. Check valve assembly 304 includes a first body 312 in the form of a cup, a second body 314 having a male threaded portion 316 extending inwardly of the cup shaped recess of the first body 314, a check valve spring 318, the closure element 308, a backing ring 320 and a conformable ring 322 having an inwardly facing frustoconical sealing surface. First body portion 312 here includes a base portion 324 having a central through opening 326 therethrough, the upper portion of which is configured as a seat 356, an annular wall 334 extending therefrom further inwardly of the first bore 60, and together with the base portion 324 creating a cup shaped recess having an inner circumferential wall 330 having threads, mating with those on male threaded portion 316 of the second body 314. The cup shaped recess includes, at the base thereof, an annular backing ring ledge 335 surrounding a first opening area, and a conformable ring ledge 336 surrounding a second opening area having a smaller opening area than the first opening area. The second body 314 includes a first annular portion 338 from which the male threaded portion 316 in the form of an annular wall extends to end at an annular bias wall 340. Closure element 308 includes a spring recess 342 formed of an annular closure element wall 344 and an annular closure element spring ledge 346, and a cage 348 extending therefrom and including a plurality of flow openings 350 extending through a side wall thereof and terminating in a conical portion 352 having a frustoconical sealing or seating surface 354 thereon, which follows a different conical contour than that of the conical portion 352 and which seats against the frustoconical seat 356 and in so doing compresses the corner of a conformable seal ring to seal the second bore 62 from the first bore 60.

To form or assemble the check valve assembly 304, conformable seal ring 322 is located against conformable ring ledge 336, and backing ring 320 is placed thereover to rest on backing ring ledge 334. Closure element 308 is located in the cup shaped recess of the first body 312 such that conical portion faces the annular openings of the backing ring 320 and conformable seal ring 322. The spring 318 is then placed in the cup shaped recess of the first body 312 of the closure element 308, and the male threaded portion 316 of the second body 314 is threaded into the threads on the first body, thereby biasing the inner surface of the first annular portion 338 against the spring 318 and press the backing ring against the backing ring ledge 334 to secure the conformable seal ring 322 between the backing ring 320 and the conformable ring ledge 336. The thus prepared check valve assembly is inserted into the first bore 60 such that the conical portion 352 faces away from the second bore 62. The inlet connector 18 is then secured over the base 26 of the valve body 12 to secure the check valve assembly 304 in the first bore 60.

In FIG. 10, the check valve assembly 304 is shown in the closure element 308 open position, which occurs when the force created by the inlet pressure from the monitored fluid line on the portion of the conical sealing surface 354 exposed within the inner circumference of the conformable seal ring 322 exceeds force of the spring 318 biasing the conical sealing face against the inner circumferential surface of the conformable sealing ring 354, such as when an overpressure condition is present in the monitored fluid line. Note, that where the closing pressure of the closure element 308 against surfaces of the conformable seal ring 354 during normal operating conditions is less than that pressure required for the relief valve 10 to operate to relieve an overpressure condition in the monitored fluid line to the vent, the closure element 308 will commonly be seated against the seat 356 as shown in FIG. 11 unless an overpressure condition is present in the monitored fluid line connected to the inlet 170 of the relief valve 10.

Removable sealing plug 20 is received within the auxiliary pumping port 28, and here is configured as a two-piece element, including a seal pin 360 having a conical head portion 362 and a shaft portion 364 extending from the conical head portion 362 with a retainer ledge 366 formed therebetween, and a threaded insert 368 having an outer threaded wall 370 and a central through bore 372 within which shaft portion 364 is received. Auxiliary pumping port includes a threaded first pumping port bore 374 extending inwardly of the outer surface of the valve body 12 and a smaller second pumping bore 376 leading therefrom and into the second bore 62 of the valve body 12. The threaded insert 368 having the shaft portion 364 of the seal pin 360 therein, is threaded into the first pumping bore 374 to secure the conical head portion 362 of the shaft portion 360 in sealing engagement with a surface of the auxiliary pumping port. Here, a frustoconical annular ledge 378 extends between the first and second pumping bores 374, 376, and the conical head portion 362 engages, and seals, against the frustoconical annular ledge 378.

To determine the opening pressure of the valve, or the pressure at which the valve seal "cracks", the pumping port plug 20 is removed by unthreading it from the auxiliary pumping port 28, and a threaded fitting 380 on the end of a tubing 382 extending from a fluid pump 384 is threaded. The pump 384, here shown schematically as a manual pump but may also be a non-manual pump, is used to pump fluid directly into the second bore 62 by pumping the fluid through the auxiliary pumping port 28, to increase the pressure thereof, whereby the check valve closure element 308 if not already seated on the seat 356, becomes seated thereon, and fluid is pumped into the sealed volume of the second bore 62 until the piston 66 begins moving against the bias of the spring 34 to move the annular seal face 110 to the position thereof shown in FIG. 6, at which the pressurized fluid begins to vent from the second bore 62 into the vent, which pressure is the cracking or opening set pressure of the relief valve 10. Thus, the opening pressure of the valve can be determined which the valve 10 is connected to other fluid components in a fluid circuit, such as a fluid control circuit, without adversely affecting the other components in the fluid circuit Additionally, this procedure can be repeated for different compression or spring force settings of the spring 34. As the force of the spring 34 against the upper surface of the spring plate is adjustable and is set by adjusting the compression of the spring 34 by rotating the spring cap 14 with respect to the body 12 of the valve 10, the procedure of determining the cracking pressure of the shear seal can be repeated for different rotation positions of the spring cap 14 with respect to the body 12, and thereby the calibration of the rotatable setting of the spring cap 14 to the cracking pressure of the relief valve 10 (or 200), or of the shear seal therein, can be reestablished while the relief valve is interconnected to a fluid circuit, such as between a monitored fluid line and a vent. Because the check valve assembly 304 isolates the inlet 170, and thus the monitored fluid line attached thereto, from the second bore 62, the pressurizing of the second bore to determine the opening or cracking pressure of the shear seal or valve can be performed without effecting the components connected to the monitored fluid line.

What is claimed is:

1. A pressure relief valve, comprising:
    a valve body including an inlet having an inlet pressure leading to an inner volume, a piston having a blind shear seal bore and a surface facing the inner volume, a vent passage and a T-shaped, in cross-section, seal plate adaptor having a seal plate surface thereon and a passage therethough in fluid communication with the vent passage and the fluid pressure there present;
    a shear seal element locatable within the blind shear seal bore comprising;
        a seal surface having a first annular area facing the seal plate adaptor;
        an annular shear seal element ledge having an annular surface area at least twice as large as the first annular area, the annular shear seal element ledge facing away from the first annular area; and
    a biasing seal ring in contact with the annular shear seal element ledge
    wherein, the seal plate adaptor has a seal groove having therein a seal ring and at least one backing ring.

2. The pressure relief valve according to claim 1, further comprising a second surface facing the seal surface, the second surface having an second annular surface area at least twice as large as the first annular area of the seal surface.

3. The pressure relief valve according to claim 2, wherein the first and second surfaces are opposing surfaces of a seal gland, and the biasing seal ring contacts the first and second surfaces.

4. The pressure relief valve according to claim 3, wherein the biasing seal, ring in a free state, has a first width in the direction between the first and second surfaces, and in the seal gland, the width of the biasing seal ring in the direction between the first and second surfaces contacting the biasing seal ring is less than the first width.

5. The pressure relief valve according to claim 4, wherein the second surface is the surface of a portion of the shear seal bore of the piston.

6. The pressure relief valve of claim 5, wherein a first space is present between a portion of the outer surface of the biasing seal ring and the second surface, and the first space is maintained at the pressure of the inner volume.

7. The pressure relief valve of claim 5, wherein a second space is present between a portion of the outer surface of the biasing seal ring and the first surface, and the second space is maintained at the vent passage pressure.

8. The pressure relief valve of claim 5, wherein a first space is present between a portion of the outer surface of the biasing seal ring and the second surface, and the first space is maintained at the monitored inlet pressure, and a second space is present between a portion of the outer surface of the biasing seal ring and the first surface, and the second space is maintained at the pressure of the vent passage.

\* \* \* \* \*